US007405897B2

(12) United States Patent
Dougherty et al.

(10) Patent No.: US 7,405,897 B2
(45) Date of Patent: Jul. 29, 2008

(54) SINGLE-PASS SELF-SERVOWRITING METHOD AND SYSTEM EMPLOYING A LOW SECTOR RATE STARTUP PROCEDURE

(75) Inventors: Kenneth James Dougherty, San Jose, CA (US); Gary Allan Herbst, San Jose, CA (US); Jong Ming Lin, Cupertino, CA (US)

(73) Assignee: Hitachi Global Storage Technologies Netherlands, Amsterdam (NL)

( * ) Notice: Subject to any disclaimer, the term of this patent is extended or adjusted under 35 U.S.C. 154(b) by 61 days.

(21) Appl. No.: 11/639,948

(22) Filed: Dec. 15, 2006

(65) Prior Publication Data
US 2008/0144210 A1   Jun. 19, 2008

(51) Int. Cl.
*G11B 21/10* (2006.01)
(52) U.S. Cl. ......................................... 360/75
(58) Field of Classification Search ................ None
See application file for complete search history.

(56) References Cited

U.S. PATENT DOCUMENTS

| 5,668,679 | A | 9/1997 | Swearingen et al. | |
|---|---|---|---|---|
| 6,600,620 | B1 | 7/2003 | Krounbi et al. | |
| 6,888,696 | B2 * | 5/2005 | Yasuna et al. | 360/78.04 |
| 6,937,420 | B1 | 8/2005 | McNab et al. | |
| 6,943,978 | B1 | 9/2005 | Lee et al. | |
| 6,965,489 | B1 | 11/2005 | Lee et al. | |
| 6,967,799 | B1 | 11/2005 | Lee et al. | |
| 6,970,320 | B2 * | 11/2005 | Sugiyama et al. | 360/75 |
| 6,977,789 | B1 | 12/2005 | Cloke et al. | |
| 6,987,636 | B1 | 1/2006 | Chue et al. | |
| 6,992,848 | B1 | 1/2006 | Agarwal et al. | |
| 6,992,852 | B1 | 1/2006 | Ying et al. | |
| 6,999,261 | B2 * | 2/2006 | Sugiyama et al. | 360/75 |
| 7,016,134 | B1 | 3/2006 | Agarwal et al. | |
| 7,019,933 | B2 * | 3/2006 | Iseri et al. | 360/75 |
| 7,019,937 | B1 | 3/2006 | Liikanen et al. | |
| 7,023,633 | B2 * | 4/2006 | Malone, Sr. | 360/75 |
| 7,116,510 | B2 * | 10/2006 | Yamamoto | 360/75 |
| 7,133,237 | B2 * | 11/2006 | Ikeda et al. | 360/75 |
| 7,164,552 | B2 * | 1/2007 | Yamamoto | 360/75 |

OTHER PUBLICATIONS

US 6,906,885, 06/2005, Agarwal et al. (withdrawn)

* cited by examiner

*Primary Examiner*—Hoa T. Nguyen
*Assistant Examiner*—James L Habermehl
(74) *Attorney, Agent, or Firm*—INCAPLAW; Terrance A. Meador

(57) ABSTRACT

A self-servowriting (SSW) method that, with the actuator fully engaged against a compliant structure (e.g., a crash-stop), first writes a tightly-spaced open-loop sequence of servo bursts in a segmented spiral path and then continues writing this tightly-spaced sequence under closed-loop servo control while reading back amplitude information from the servo bursts written earlier until the tightly-spaced burst pattern extends over several read-write head (RWH) offset intervals. With the actuator still engaged against the compliant structure, this tightly-spaced startup sequence is then read back by the closed servo control loop to write a number of concentric servo seed tracks, which are then self-propagated across the remainder of the disk surface to produce a final servopattern.

20 Claims, 11 Drawing Sheets

$$\text{Position } x = \frac{\sum_1^7 x_n y_n}{\sum_1^7 y_n}$$

SINGLE-PASS SELF-SERVOWRITING METHOD AND SYSTEM EMPLOYING A LOW SECTOR RATE STARTUP PROCEDURE

BACKGROUND

This invention relates generally to self servowriting procedures for hard disk drives and more particularly to a non-iterative low sector rate startup procedure for writing the servo seed tracks necessary for radial propagation of the embedded servo positioning information in a data storage device.

Generally, during the hard drive manufacturing process, the hard drive is placed in a servo track writer (STW) that embeds track position information (servopattern) directly on the disk data storage surface at regular intervals in the tracks between data sectors. The hard drive servo controller is programmed into a chip located in-situ on the printed circuit board. The servo controller is updated with the actual position of the read-write head (RWH) by reading the servopattern and the desired RWH position is determined by the known storage location of the target bit. The difference between the desired and actual position is the position error signal (PES). The servo controller operates a closed servo control loop to minimize the PES by sending to a voice coil motor (VCM) the electrical current level (VCM signal value) necessary to cause an actuator arm to move the RWH into the proper radial position. The servo control loop operates in a track following mode when reading data on a track and in a track seek mode when moving to another track for more data. Operation of the servo control loop may be appreciated with reference to, for example, U.S. Pat. No. 5,381,281.

Historically, the servowriting process required special factory STWs operating under laser control in clean rooms, which quickly became a primary manufacturing bottleneck because of the capital and operating costs of STWs and because of the lengthy period (nearly an hour) devoted to the servowriting process for each hard drive. Practitioners in the hard drive manufacturing art devoted significant efforts to overcoming this servowriting bottleneck, and one of the most attractive improvement strategies is to move the servowriting process out of the clean room and into the disk drive device itself, a process denominated "self servowriting."

Self-servowriting (SSW) is an attractive technique because it eliminates the need for costly, external positioning systems, and can be performed outside of a clean room environment. In general, this technique involves using the RWHs installed on the actuator of the disk drive in-situ to initially write the servopattern, which is thereafter used to correctly position the actuator during drive operation by a user. Disadvantageously, the open-loop in-situ servo control loop is unable to position the servopattern with the precision necessary to maintain the high track density expected in modern disk drives (100,000 tracks per inch and more).

The disk drive art is replete with proposals for overcoming this open-loop disadvantage. For example, the STW and clean room may be employed to write a few "seed" tracks to the data storage surface, which may then be later used to "self-propagate" the remainder of the servopattern under closed-loop control of the in-situ servo controller, thereby saving most of the clean-room time normally required for the servowriting process. This practice may be appreciated with reference to, for example, U.S. Pat. Nos. 5,949,603; 6,600,620; 6,631,046; and 6,977,789.

For recent disk drive track densities, the read element in the RWH on the actuator may be offset from the write element by several (5 or more) tracks. When this read-to-write element offset is large in terms of track spacing, a combination of readback amplitudes from several earlier-written servo tracks is disadvantageously needed to provide a position signal sufficiently accurate to propagate the next servo track during the self-propagation process. U.S. Pat. No. 5,757,574 proposes a basic method for overcoming this self-propagation disadvantage. Others propose writing servo bursts along a plurality of spiral paths covering the radial extent of the disk surface for later use in controlling self-propagation of a final servopattern. For example, U.S. Pat. Nos. 6,906,885; 6,943,978; 6,965,489; 6,992,852; 6,987,636; and 7,016,134 all propose adding a precise spiral servo-burst pattern to the disk surface, sometime with accompanying circular "seed tracks" for later use in self-propagating the final servopattern.

Such techniques generally require some access to the laser-controlled STW in a clean-room at some point during manufacture, which disadvantageously introduces the production bottleneck (if to a lesser degree) discussed above. Other practitioners propose techniques for correcting servopattern position errors by, for example, reading the pattern and storing measured errors in a memory on the hard drive circuit board for later use by the servo control loop. for example, reference is made to U.S. Pat. Nos. 6,937,420; and 6,061,200. Such methods are of limited efficacy at very high track densities and require additional manufacturing time and complexity.

In view of the above, the art is now replete with proposed self servowriting techniques that require no access to clean-room STWs, thereby completely eliminating that production bottleneck. Naturally, practitioners have long sought SSW techniques that can be initiated from scratch, in-situ, without a clean-room STW, but the rapid increase in track density has provided a continuing and difficult challenge for such solutions. One such proposal employs a magnetic imprinting technique to "print" a rudimentary magnetic pattern onto the disk surface during assembly for later use in self-propagating the final servopattern across the disk surface under closed-loop control of the in-situ servo controller (e.g., U.S. Pat. No. 7,099,107). Others propose various "trial and error" techniques for writing "startup" patterns under open-loop in-situ servo control conditions for use in self-propagating the final servopattern. For example, U.S. Pat. No. 5,668,679 uses an external controller to write a spiral startup pattern by controlling the in-situ electronics under open-loop conditions. The spiral pattern is read back and rewritten repeatedly until certain parameters are attained (if ever), and then the spiral pattern is used to self-propagate the final servopattern across the disk surface. This technique is complex, time-consuming and may not always ensure a useful servopattern in production conditions.

The commonly-assigned U.S. Pat. No. 6,603,627 (incorporated entirely herein by reference) describes another "trial and error" startup method for creating an initial open-loop set of concentric "seed" tracks using a compliant crashstop to control RWH movement. This method indeed avoids the use of clean room STWs, but the startup process requires a readback and rewrite of the servo seed tracks until certain parameters are obtained before self-propagating the remainder of the servopattern, so the startup process duration and final result are predictable only in the aggregate in a factory setting and may not be controllable. The commonly assigned U.S. Pat. No. 6,600,621 (incorporated entirely herein by reference) describes a method for controlling error growth during servo track self-propagation but does not consider the in situ startup problem.

Accordingly, there is still a well-known need in the art for a SSW system that eliminates trial and error from the startup procedure to provide a controlled startup process leading to a final servopattern in a predictable time. These unresolved problems and deficiencies are clearly felt in the art and are solved by this invention in the manner described below.

SUMMARY

The above problems are resolved as described herein by introducing a new self-servowriting (SSW) startup method that arises from two unexpectedly advantageous observations. First, the inventors observed that when the actuator is damped up against a crashstop, it is possible to operate the servo control loop at a very low sector rate, e.g., one readback sample per 10 revolutions. Secondly, the inventors observed that when a sequence of servo bursts are written in a tightly-spaced radial pattern and when the read head response profile has a known linear region, it is possible to determine the radial distance between bursts with fractional-track precision from the servo burst readback amplitudes alone. From these two observations, the inventors have discovered a new SSW method that first forces the actuator against a compliant structure (crashstop), next steps the voice coil motor (VCM) signal in a predetermined manner to write a tightly-spaced open-loop sequence of servo bursts and then continues writing this tightly-spaced sequence under closed-loop servo control derived from amplitude information read back from the servo bursts written earlier, until the tightly-spaced servo burst pattern extends radially over several read-write head (RWH) offset intervals. With the actuator still engaged against the compliant structure, a number of concentric servo seed tracks are written under closed-loop servo control derived from amplitude information readback from the tightly-spaced startup sequence. Finally, the servopattern is self-propagated across the remainder of the disk surface from the servo seed tracks.

An additional tightly-spaced pre-startup servo burst sequence is preferably first written and read back to calibrate VCM response, RWH offset, magnetoresistive (MR) read head sensitivity, and the like, and to facilitate the selection of the VCM steps for the actual startup sequence. With these pre-startup calibration data and with a low sector rate servo control loop facilitated by the actuator crashstop engagement, a single startup sequence is sufficient to initiate the entire SSW process for 100,000 tracks per inch and more without trial and error.

The foregoing, together with other features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DETAILED DESCRIPTION OF THE PREFERRED EMBODIMENTS

Introduction

Figure 1:
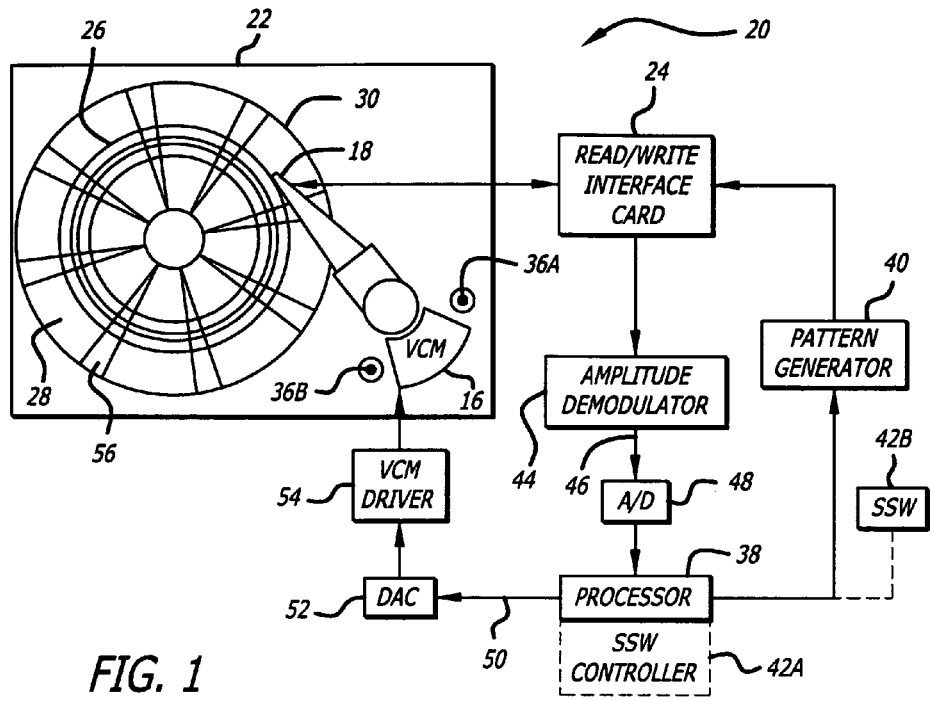
FIG. 1 is a schematic diagram illustrating an exemplary data storage device (DSD) embodiment with a storage medium, associated servo electronics and crashstop used in the self-servowriting (SSW) system of this invention.

FIG. 1 shows a data storage device (DSD) embodiment 20 incorporating the system of this invention for self-servowriting (SSW) startup and radial self-propagation and servopattern writing. A hard disk drive (HDD) 22 is connected to the read-write electronics 24 for reading and writing magnetic transition patterns organized in a plurality of data storage tracks exemplified by the track 26 over a plurality of sectors exemplified by the sector 28 on a data storage surface of the rotating data storage medium 30, and for activating the voice coil motor (VCM) 32 that moves the actuator-supported read write head (RWH) 34 across medium 20 in a generally radial direction. The term "actuator" is used broadly herein to connote any or all of the moveable components VCM 32, the actuator arm, and the RWH 34 (with its associated access elements).

Both an inner diameter (ID) crashstop 36A and an outer diameter (OD) crashstop 36B are shown for illustrative purposes. Crashstops 36A-B provide limits to the actuator movement at the ID and OD of the data storage surface of medium 30. Either or both crashstops 36A-B may be embodied as, for example, a fixed cylindrical rod against which the side of the actuator is forced at the travel limit. Alternatively, crashstop 36B may be embodied as a load-unload ramp adapted to lift RWH 34 from the surface of medium 30 and facilitate movement of RWH 34 beyond the OD edge of medium 30. Crashstops 36A-B may also be embodied to include a lossy compliant layer sandwiched between the actuator and fixed element to absorb and dissipate the mechanical energy transferred from the moving actuator. The complaint material may be mildly thixotropic and slowly relax under pressure from the actuator, for example, or the compliant material parameters may be selected to assist the SSW startup process of this invention, for example.

The processor 38 controls a pattern generator 40 that writes patterns of magnetic transitions on selected regions of the medium and may include an internal SSW controller 42A for generating a servopattern in the manner described herein below. Alternatively, processor 38 may operate without an internal SSW controller 42A and instead couple to an external SSW 42B to generate a servopattern in the manner described herein below. The readback signal from the read element of RWH 34 is demodulated by an amplitude demodulator 44 to yield the amplitude signal 46 that reflects the overlap of the read element with the previously written magnetic transition patterns on medium 30. Amplitude signal 46 is digitized by an analog-to-digital converter (ADC) 48 and manipulated by processor 38 to obtain a position error signal (PES). Processor 38 produces a numerical VCM control signal 50 (also herein denominated a VCM signal value) that is converted to analog form by the digital-to-analog converter (DAC) 52 and presented to the VCM driver circuit 54, which responsively generates a current to drive VCM 32, whereby RWH 34 is repositioned radially over medium 30. These elements together form a servo control loop for managing the position of RWH 34 on the data storage surface of medium 40 by reading servo positioning information embedded between sectors on every track in servo wedges exemplified by the servo wedge 56. In the aggregate, all embedded servo positioning information is herein also denominated a servopattern.

Figure 2:
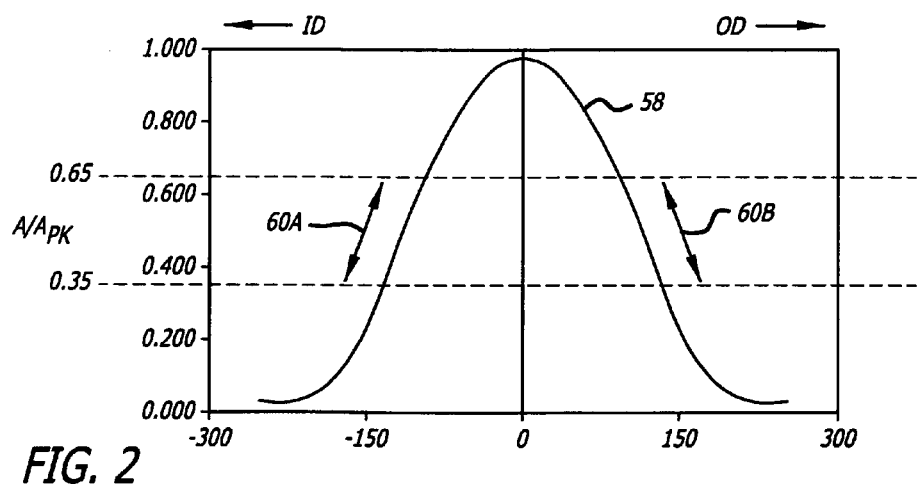
FIG. 2 is a chart illustrating the readback signal amplitude for a single track-centered servo burst as a function of radial off-track position for an exemplary magnetoresistive (MR) read head suitable for use with the system of this invention.
Figure 3:
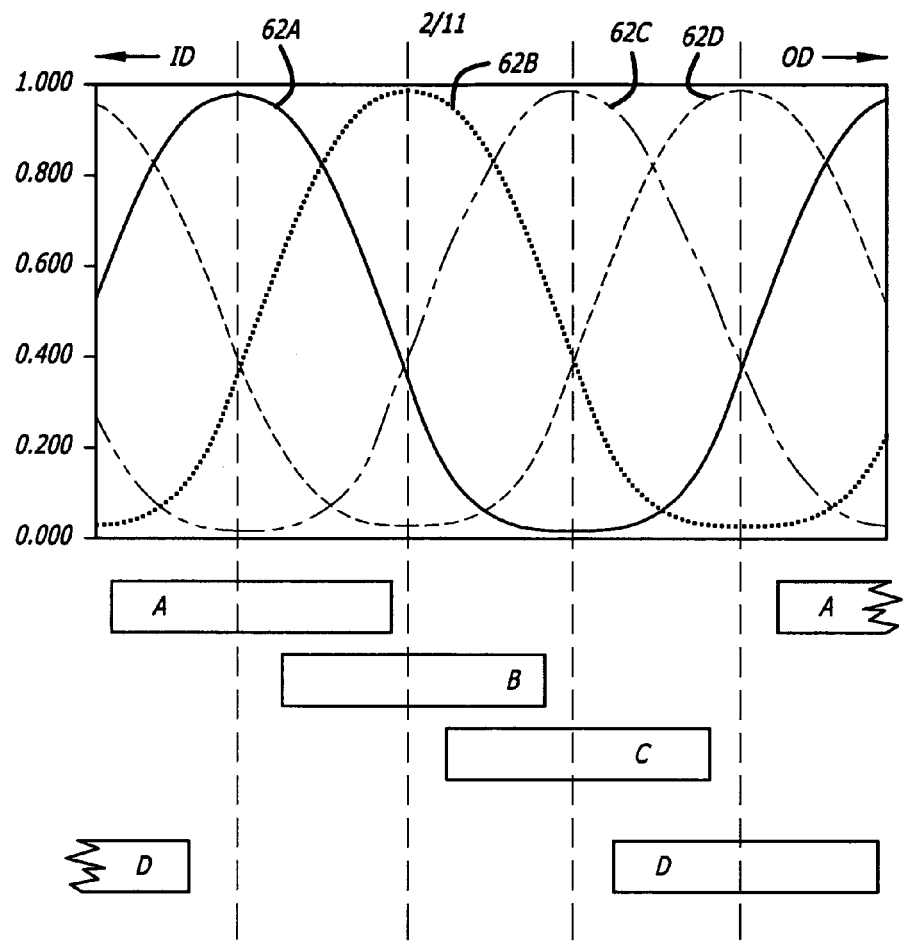
FIG. 3 is a chart illustrating the readback signal amplitudes for a typical quadruple servo burst sequence (ABCD) as a function of radial position for the MR read head of FIG. 2.

FIG. 2 is a chart wherein the curve 58 illustrates the readback signal amplitude versus radial position over a single track-centered servo burst as a function of radial off-track position for a magnetoresistive (MR) read head element in RWH 34 (FIG. 1). The x-axis represents off-track position in exemplary digital units representing the offset of numerical VCM control signal 50 (FIG. 1) from the VCM signal value at track center position and the y-axis represents the servo burst readback amplitude as a percentage of the peak track-center value. MR read head characteristic 58 is substantially linear in both the ID and OD regions 60A-B, from 35-65% of peak, which is preferred. FIG. 3 is a chart wherein the four curves 62A-D illustrate the readback signal amplitude versus radial position over an exemplary quadruple servo burst sequence (ABCD) as a function of radial position for an the MR read head element in RWH 34 (FIG. 1). The crossover point 64 is herein denominated the A plus C Target (APCT) half-amplitude for the example shown. Although the example in FIG. 3 shows the exemplary on-track signal ratio (A+C)/B for B-burst at APCT point 64 to be about 80% (with a 40% APCT half-amplitude), the inventors prefer an ABCD servo burst sequence spacing in the servo tracks that brings this ratio down to about 70% (with a 35% APCT half-amplitude), which is at the lower limit of the linear regions 60A-B (FIG. 2). Such servo burst spacing exploits more of the linear region of the MR head for purposes of the method of this invention.

Figure 4:
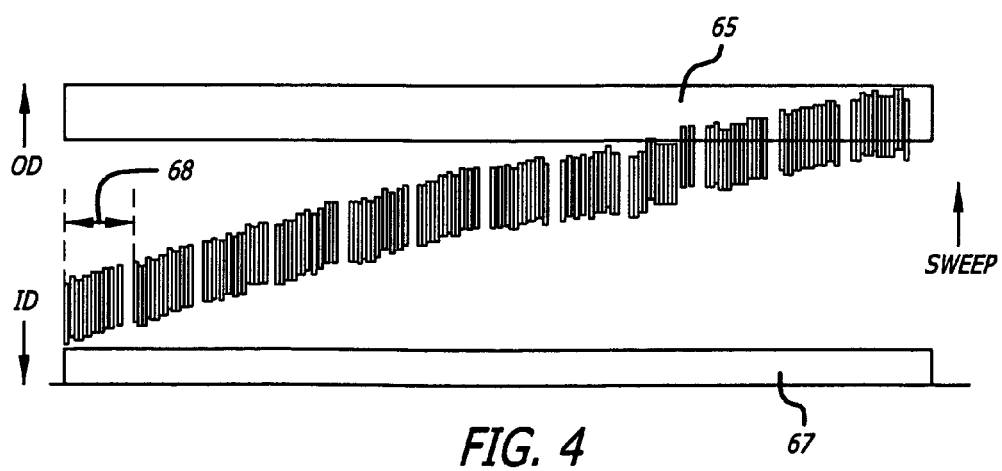
FIG. 4 is a schematic diagram illustrating a portion of an exemplary tightly-spaced servo burst sequence written according to the method of this invention.

The Tightly-Spaced Servo Burst Sequence:

FIG. 4 is a schematic diagram showing an exemplary read element path 65 and write element path 67 through an exemplary tightly-spaced servo burst sequence embodiment 66 of this invention. Referring to FIG. 1 and the discussion of FIG. 11 below, sequence 66 is written after forcing the actuator against ID crashstop 36A (which is herein preferable to OD crashstop 36B), where the actuator remains during the entire process because moving the actuator off of crashstop 36A (and thereby moving RWH 34 out of the crashstop region of the data storage surface) requires, in this example, stepping the VCM radially by the equivalent of several hundred tracks. FIG. 4 shows sequence 66 extending circumferentially over 12 sectors in the crashstop region of the data storage surface, which represents a fraction of the 270 sectors available over a single disk revolution in this example. Because FIG. 4 is not shown to scale, sequence 66 exhibits a "spiral" pattern and may herein also be denominated a "spiral" sequence because of the incremental distribution of the individual servo bursts within each sector. However, in this example, the first sector 68 extends over 1.33-degrees of circumference and passes under RWH 34 in 22-30-:sec depending on disk speed. The leftmost servo burst 70, is written with a 1.6-:sec AC signal beginning at the edge of sector 68. The second burst is written as close as possible to burst 70 during the next revolution of the disk, using timing information from the spindle motor or other useful means for circumferential timing, so that each 1.6-:sec servo burst in sequence 66 is written during a new disk revolution (one per revolution). Between the bursts, the numerical VCM control signal 50 is stepped to the next VCM signal value in a predetermined sequence. For example, the digital input to DAC 52 (FIG. 1) may be stepped by one so that RWH 34 is stepped radially by perhaps 3% of a track in this example. After, for example, nine tightly-spaced bursts are written in the first sector 68, the next burst is written at the beginning of the sector immediately downstream from sector 68 in a position that is spaced from the preceding burst by the remaining empty space in sector 68. If the first nine 1.6-:sec servo busts in sector 68 occupy 15-18-:sec, then the empty gap is perhaps as long as 15-:sec. Eventually, after perhaps three sectors, sequence 66 extends radially across a single track and perhaps 12-15 sectors are written before sequence 66 spans the entire radial RWH offset 72. From this description, it is apparent that tightly-spaced servo burst sequence 66 is only loosely characterized as a "spiral" pattern and is perhaps more properly denominated a "segmented spiral sequence," for example. Nevertheless, sequence 66 and other similar tightly-spaced servo burst sequences described may herein also be denominated and illustrated "spirals" for convenience.

Figure 5:
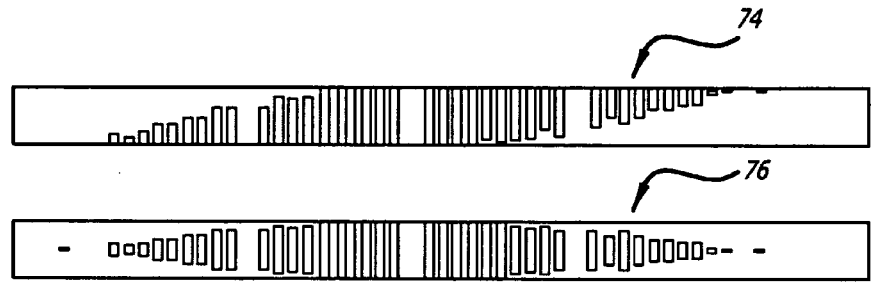
FIG. 5 is schematic diagram comparing an exemplary read path through the servo burst sequence of FIG. 4 with the resulting readback signal amplitude.

FIG. 5 is schematic diagram comparing an exemplary read path 74 through servo burst sequence 66 (FIG. 4) with the resulting readback signal amplitude envelope 76. FIG. 5 shows that the readback signal envelope 76 from sequence 66 includes at least a small sample of every one of the perhaps 30-35 servo bursts in sequence 66 encountered by the read element fo RWH 34 (FIG. 1) during each revolution of the data storage surface. If RWH 34 is moved radially, a similar envelope is developed over a different portion of spiral sequence 66. If envelope 76 is synchronized to the spindle motor signal or some other circumferential clock signal, the radial location of the read head may be derived from knowledge of the VCM signal values first employed to write sequence 66. If a spindle motor or clock signal is not available, each burst in sequence 66 may, alternatively, be written to include a gray code representing the actual VCM signal value and sector number in addition to the AC signal burst, for example.

Figure 6:
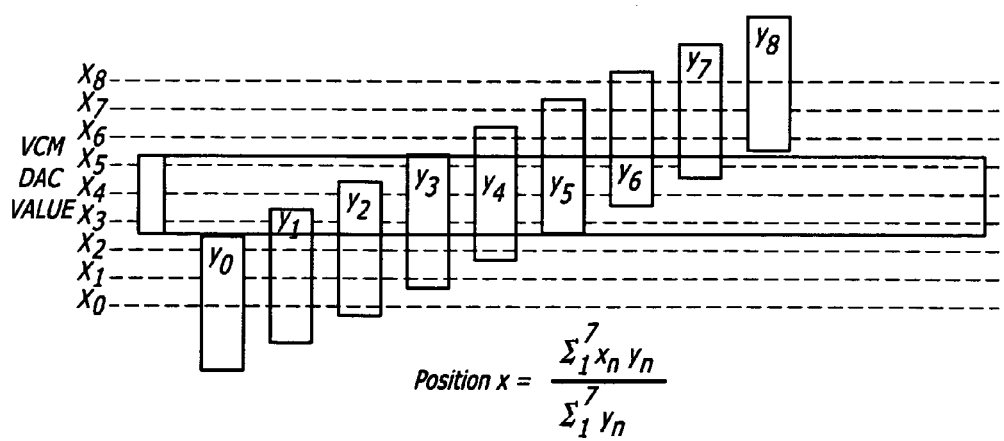
FIG. 6 is a schematic diagram illustrating an alternative method for deriving radial head position from the readback signal amplitudes for the tightly-spaced servo burst sequence of FIG. 4.
Figure 7:
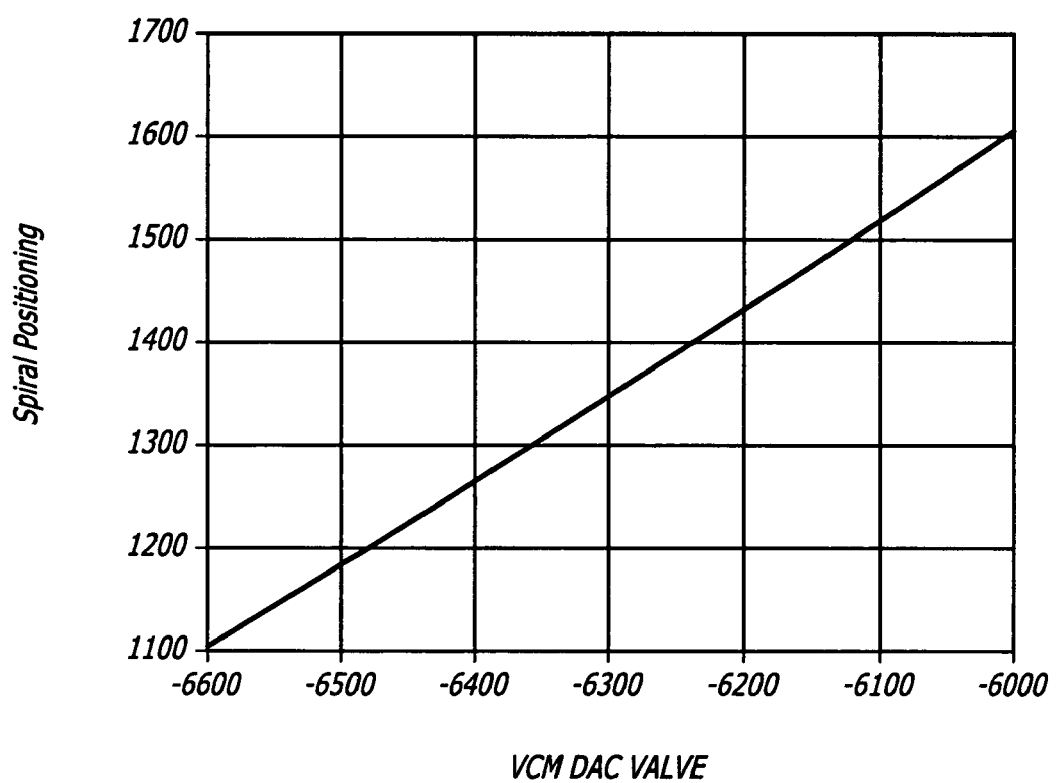
FIG. 7 is a chart illustrating the absolute radial head position information obtained from the readback signal amplitudes for the tightly-spaced servo burst sequence of FIG. 6.

FIG. 6 is a schematic diagram illustrating a method for deriving radial head position from the signal amplitudes read back from a tightly-spaced servo burst sequence 78 written to include in each burst $y_n$ a gray code representing the VCM signal value $x_n$ produced to write burst $y_n$ during sequence generation. The VCM signal value x corresponding to the RWH readback position (adjusted for RWH offset) may be computed simply by summing the products $(x_n y_n)$ of the readback burst amplitude and embedded VCM signal value and dividing by the total readback burst signal amplitude. FIG. 7 is a chart illustrating the absolute radial head position information obtained from the readback signal amplitudes for the tightly-spaced servo burst sequence of FIG. 6. The horizontal axis represents the value of numerical VCM control signal 50 (FIG. 1) and the vertical axis represents the burst in sequence 66 or 78 (FIGS. 4 and 6) over which RWH 34 is centered radially.

Figure 8A:
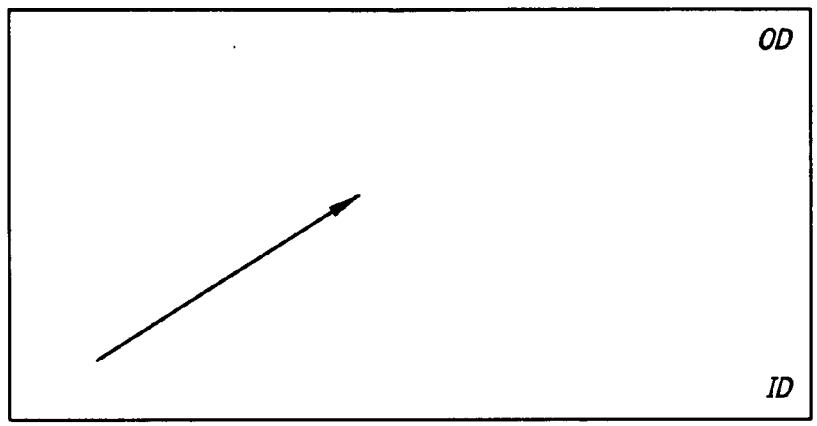
FIGS. 8A-C are schematic diagrams illustrating several alternative continuous tightly-spaced servo burst sequences suitable for use with the system of this invention.
Figure 8B:
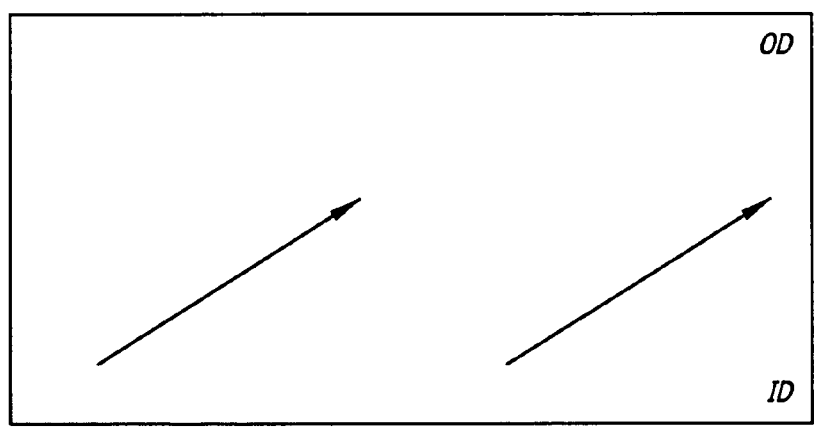
Figure 8C:
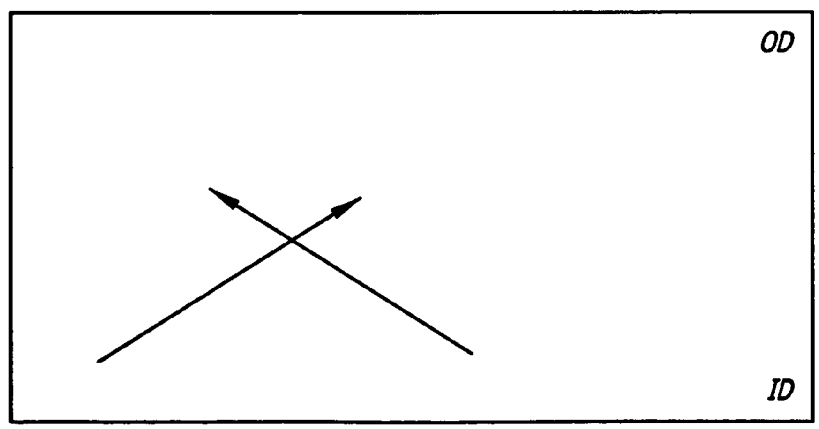
Figure 9A:
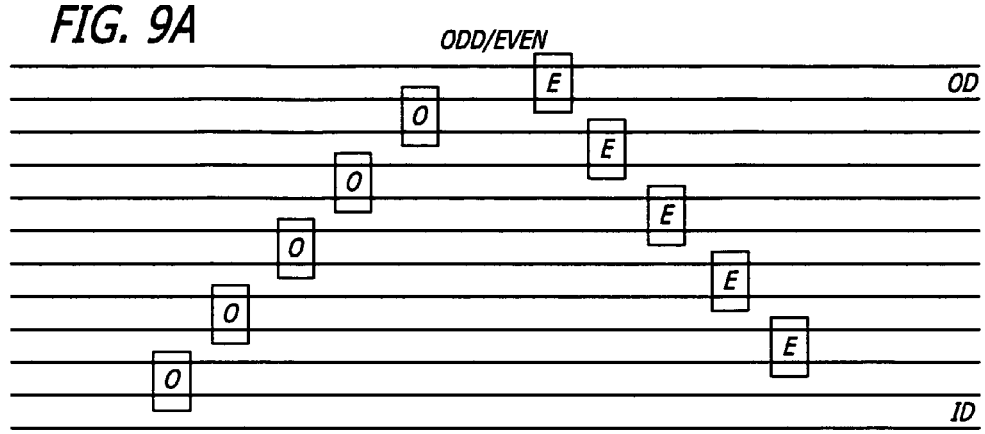
FIGS. 9A-C are schematic diagrams illustrating several alternative odd-even tightly-spaced servo burst sequences suitable for use with the system of this invention.
Figure 9B:
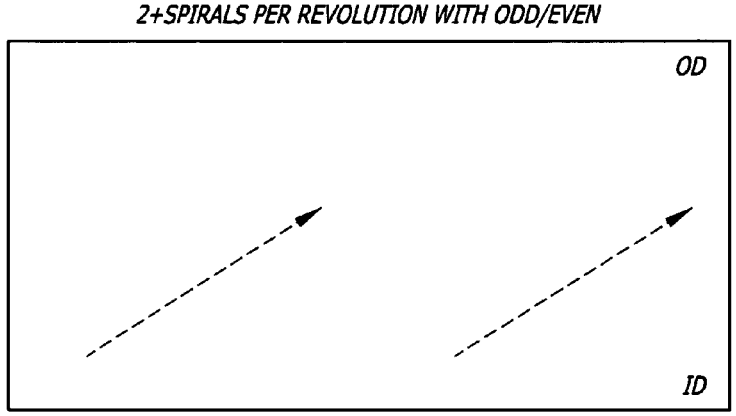
Figure 9C:
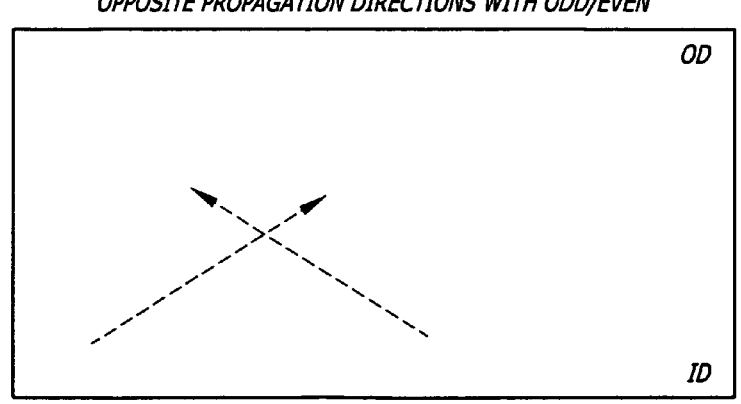

FIGS. 8A-C are schematic diagrams illustrating several alternative continuous tightly-spaced servo burst sequences suitable for use with the system of this invention. In each case, the vertical axis depicts the radial dimension from ID to OD and the horizontal axis depict the circumferential dimension around the disk surface. FIG. 8A shows the sequence discussed above in connection with FIGS. 4 and 6, which is a single "spiral" sequence formed by writing a single servo burst per revolution. FIG. 8B shows an alternative tightly-spaced servo burst sequence including two "spiral" sequences formed by writing two servo bursts on a common diameter at a single actuator position per revolution. This has the feature of providing two readback signal envelopes per revolution. FIG. 8C shows an alternative tightly-spaced servo burst sequence including two "spiral" sequences formed by writing two servo bursts at a single actuator position per revolution with the two sequences propagated in opposite circumferential directions. This also has the feature of providing two readback signal envelopes per revolution although the spacing is variable. FIGS. 9A-C are schematic diagrams illustrating several alternative odd-even tightly-spaced servo burst sequences suitable for use with the system of this invention. FIG. 9A shows a basic odd-even sequence, which is a dual "spiral" sequence formed by writing a single servo burst per revolution with odd- and even-numbered bursts propagated in opposite directions. This has the feature of spreading each readback envelope over each revolution. FIG. 9B shows an alternative tightly-spaced servo burst sequence including two dual "spiral" sequences formed by writing two servo bursts on a common diameter at a single actuator position per revolution with odd- and even-numbered bursts propagated in opposite directions within each dual sequence. This has the feature of spreading two readback signal envelopes over each revolution. FIG. 9C shows an alternative tightly-spaced servo burst sequence including two dual "spiral" sequences formed by writing two servo bursts at a single actuator position per revolution with the two sequences propagated in opposite circumferential directions and with odd- and even-numbered bursts also propagated in opposite directions within each dual sequence. This also has the feature of spreading two readback signal envelopes over each revolution although the spacing is variable. Other patterns are also available but the essential utility of the tightly-spaced servo burst sequence is the capacity to relate radial head position to servo readback amplitude without closing the servo control loop. Such patterns are useful for this purpose provided that the actuator is stabilized against the crashstop and the RWH is accessing the crashstop region of the data storage surface.

Figure 10:
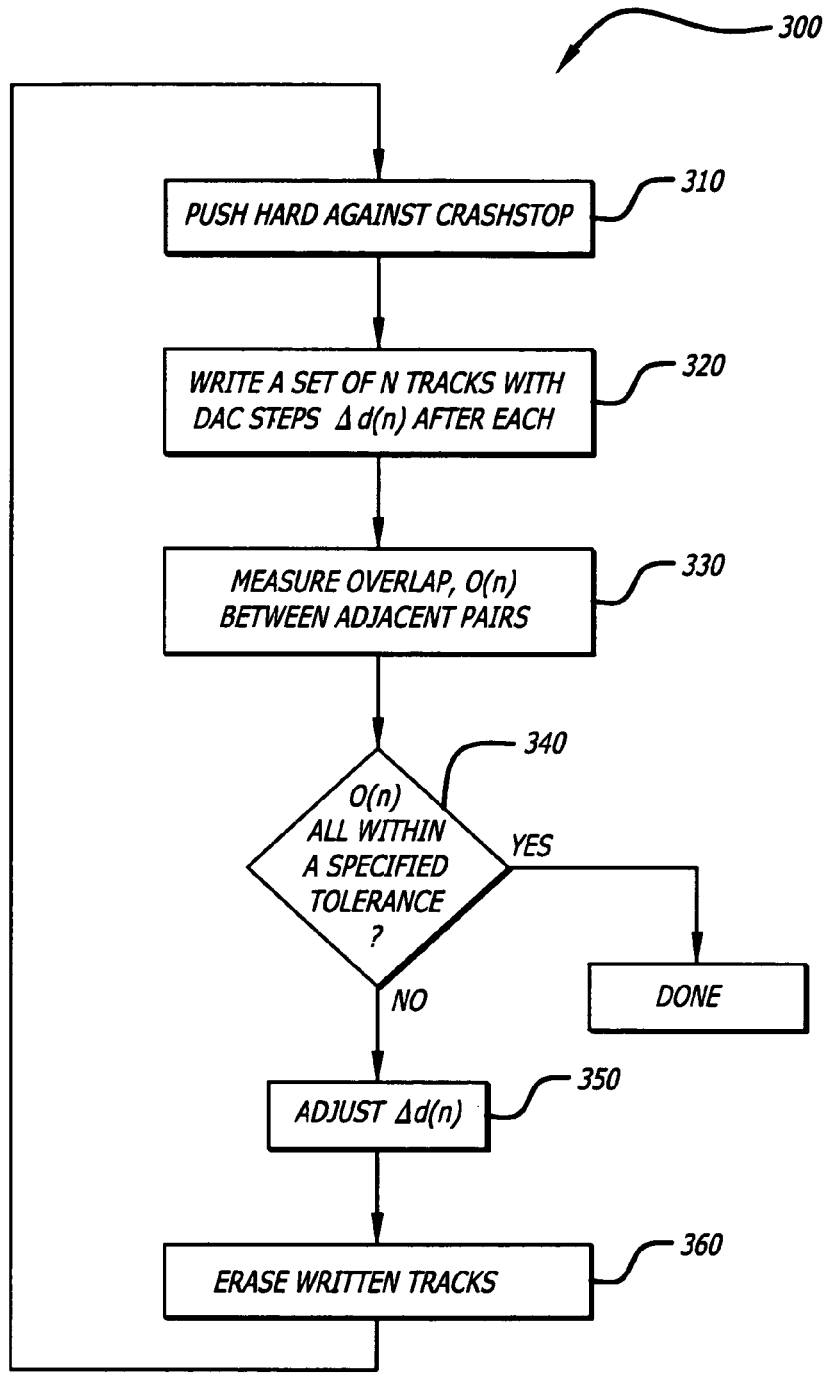
FIG. 10 is a flow chart illustrating a SSW startup method from the prior art.

The SSW Startup Procedure:

FIG. 10 is a flow chart illustrating a SSW startup method 300 from the prior art (U.S. Pat. No. 6,603,627), which is briefly described for better appreciation of the SSW startup procedure of this invention. The first step 310 is to force the actuator arm hard against the crashstop using a large numerical VCM signal value. Then, a series of tracks are written at the step 320 with the numerical VCM signal value stepped by a certain amount between tracks. Since the mechanical characteristics of crashstops are not always sufficiently reproducible to allow the VCM signal steps to be completely predetermined by experiments on prototypes, this first pass of writing uses initial guesses for the VCM signal step sizes. These may be predetermined by experiments on a small number of prototypes. Next, at the step 330, the spacing between tracks is checked by measuring the "overlap" signal, which is equal to the sum of the normalized readback amplitudes for a pair of tracks when the read element is positioned such that it overlaps both tracks by approximately equal amounts. This overlap signal decreases with increasing track spacing and therefore provides a measurement of relative track spacing. The overlap for each pair of tracks is compared to a desired overlap target value $O_{target}$ at the step 340. If all pairs match within a specified tolerance, the process is complete. If not, adjustments are made to the VCM signal steps at the step 350 to improve the agreement on the next attempt, following the track erasure made in the step 360. In this way, differences between crashstop compliance from HDD to HDD can be automatically accommodated. The overlap target is predetermined, and corresponds to a value that yields the desired spacing between servo tracks.

Before repeating the writing step with the improved VCM signal step values, the old pattern is erased in step 360. The numerical VCM signal is set to a value that typically brings the actuator arm into light contact with the crashstop and the write gate is enabled to provide continuous DC erasure. The VCM signal value is gradually stepped to higher values in a manner that ensures that the RWH moves less than one write width during each revolution of the disk. At this point, the actuator arm is once again forced against the crashstop at step 310 to prepare for the process of writing another sequence of tracks. This iterative sequence of erase/write/check/adjust is repeated until the measured seed track spacing is within specified tolerance limits. The final set of tracks are not erased so they may be used to begin propagation of the final servo-pattern across the data storage surface.

Figure 11:
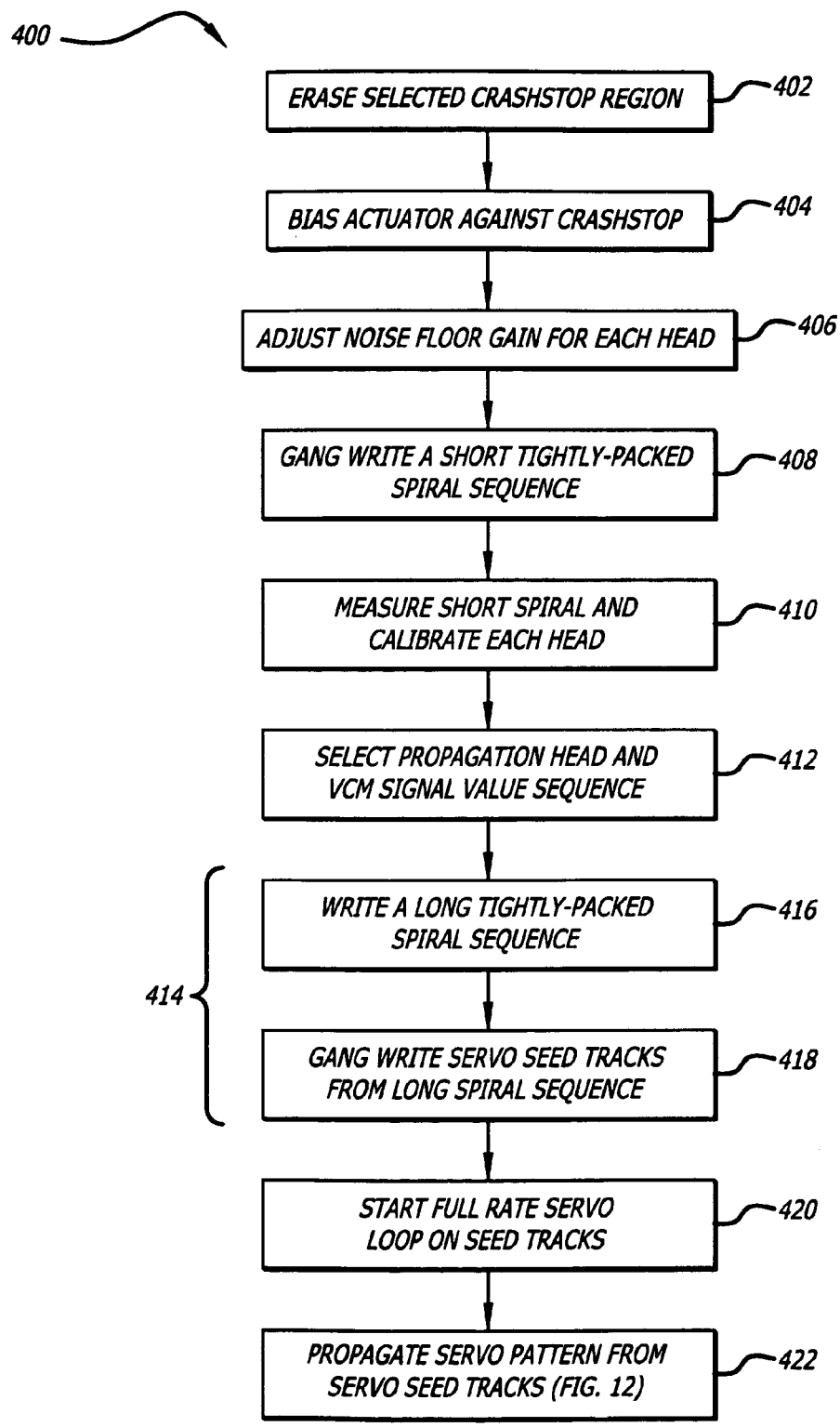
FIG. 11 is a flow chart illustrating the SSW startup method preferred for the system of this invention.

FIG. 11 is a flow chart illustrating the SSW startup method 400 preferred for the system of this invention, which is now described with occasional references to FIGS. 1-6. In the first step 402, the selected crashstop region of all data storage surfaces of rotating data storage medium 30 are erased. As used herein, this crashstop region denominates the region on each data storage surface with which RWH 34 maintains a transducing relationship while the actuator arm is engage in contact with the respective crashstop, which is preferably the ID crashstop 36A. The crashstop region in this example may extend radially for over 300 track widths over the data storage surface from the ID crashstop region boundary at which the actuator arm is tightly forced against crashstop 36A to the OD crashstop region boundary beyond which the actuator arm no longer has any contact with crashstop 36A. The particular properties of the complaint crashstop material may be selected to facilitate the SSW startup method 400 of this invention. Preferably, but not necessarily, the crashstop material is selected to exhibit a generally linear spring constant so that the actuator arm displacement is generally linear with respect to the numerical value of VCM signal 50, for example. In step 402, VCM signal 50 is swept through a predetermined range of values necessary to erase the entire crashstop region of each data storage surface before generating a large VCM signal value to move the actuator arm firmly against crashstop 36A in the next step 404.

In the next step, the noise gain floor is calibrated for each RWH read channel. This step is performed immediately following the erasure step 402 and requires repeating the following steps for each RWH.

| | |
|---|---|
| Step 406(a) | Increase the read channel gain to a value high enough to saturate the read channel in the presence of any burst signal; and reject the RWH if the channel does not saturate. |
| Step 406(b) | Read baseline noise level and adjust gain downward until the baseline noise is reduced to a predetermined threshold (e.g., 200/4095). |

After calibrating all heads, the next step 408 is performed to gang-write a short tightly-spaced open-loop "spiral" sequence. As used herein, "open-loop" denominates a process that is performed without radial position feedback and "closed-loop" denominates a process that is performed with radial position feedback that includes but is not limited to the conventional track "seek and follow" quad-servo feed-back known in the art. Referring to FIG. 4, the short open-loop tightly-spaced sequence is simultaneously ("gang") written to the crashstop regions of all data storage surfaces by performing the following steps. Circumferential position may be determined from a spindle motor signal or an existing clock track, for example. The servo burst may include gray code containing the VCM Signal value and the sector number, for example.

| | |
|---|---|
| Step 408(a) | Select a predetermined sequence of numerical VCM signal values. |
| Step 408(b) | Write a single burst in a sector and increment the burst number (and sector number after N bursts are written in a sector). |
| Step 408(c) | Increment the VCM signal value to the next value in the predetermined sequence. |
| Step 408(d) | Write another single burst immediately after the previous burst on the very next revolution of the disk. No settle time is necessary. |
| Step 408(e) | Repeat Steps 408(c)-(d) until well after the first servo bursts are seen by the read head whereupon the sequence extends radially beyond the RWH offset distance (e.g., 10-15 tracks or 300-500 bursts). |

As may be appreciated with reference to FIG. 4, for example, the bursts written in this manner are not evenly spaced radially and may not even be monotonically increasing in radial position. Actuator bearing slip and roll, crashstop compliance nonlinearities, thermal drift, mechanical vibration, and many other factors may operate to randomize the positions of bursts in this open-loop sequence. After gang-writing this short tightly-spaced sequence on all disk surfaces, the next step 410 measures the short sequence and calibrates each RWH in DSD 20 by performing the following steps for each RWH.

| | |
|---|---|
| Step 410(a) | Scan the RWH from extreme ID toward the OD of the crashstop region until bursts are detected. If none detected, reject the RWH and repeat for the next RWH. |
| Step 410(b) | Center the RWH on the tightly-spaced sequence by bringing and keeping the first (e.g., 232) and last burst number (e.g., 258) average equal to half of the number (e.g., 500) of bursts written. |
| Step 410(c) | Adjust the Arm Electronics (AE) Gain, Channel Attenuation and Variable Gain Amplifier (VGA) Gain to obtain the desired burst readback amplitude and reject the RWH if the gain exceeds a threshold. |
| Step 410(d) | Perform an A-D time measurement to obtain the RWH offset delay. |
| Step 410(e) | Readjust the AE Gain, Channel Attenuation and VGA Gain with the integration window centered on the burst to refine the readback amplitude. |

-continued

| | |
|---|---|
| Step 410(f) | Sweep the short tightly-spaced sequence from ID to OD and collect the maximum amplitude encountered for each burst for normalization during the next step. |
| Step 410(g) | Sweep the short tightly-spaced sequence from ID to OD during each disk revolution:<br>(1) Measure the radial distance moved during the disk revolution;<br>(2) Accumulate the radial distance moved to obtain the current radial position in arbitrary amplitude units;<br>(3) Collect the ID and OD half-amplitude positions (iPos, oPos) for each burst in the same amplitude units; and<br>(4) Collect the ID and OD APCT half-amplitude positions (iAPC and oAPC) for each burst in the same amplitude units. |
| Step 410(h) | (1) Calculate the write width by averaging the (iPos - oPos) difference accumulated for all bursts;<br>(2) Calculate the desired servo track distance by averaging the (iAPCT - oAPCT) difference accumulated for all bursts;<br>(3) Calculate the new VCM signal value sequence needed for improving the slope of the tightly-spaced sequence for use in writing the long tightly-spaced sequence in step 416. |

Step 410(*g*) above is performed to obtain the tightly-spaced sequence burst position data (iPos, oPos, iAPC and oAPC), which are used in the next step 412 to select a single RWH for the SSW startup and propagation procedure and to develop a sequence of predetermined VCM signal values for producing (in step 416) the main SSW tightly-spaced sequence of this invention. In step 410(*g*), the measurement of the radial distance moved from revolution to revolution by the RWH while sweeping from ID to OD is the key to mapping out the actual burst positions in the short sequence, which were written without servo control and radially disposed mainly by means of the interaction of a predetermined VCM signal value with the compliance of the crashstop material. The generally thixotropic character of crashstop materials used in the art has, until now, obliged practitioners to use lengthy trial and error approaches to positioning servo bursts in this manner. The initial assumptions in step 410(*g*)(1) are: (a) the RWH is moving so slowly that less than one-half the width of the write element (e.g., element 65 in FIG. 4) is traversed during a single disk revolution; (b) the sweep is generally from ID to OD (an arbitrary choice) and (c) the sweep starts in the erased crashstop region before the start of the short tightly-spaced sequence so no bursts are encountered during the first revolution. The RWH may occasionally "back-up" during the sweep but this presents no problems as long as the traverse speed is less than 35% of the read element width (e.g., element 67 in FIG. 4) per disk revolution. The actuator arm may simply be forced against the crashstop with increasing force until no bursts are encountered by the read element. After positioning at the ID, the sweep proceeds with the following steps performed during each revolution while sweeping radially from ID to OD:

| | |
|---|---|
| 410(g)(1)(A) | Read all of the circumferential bust slots that were written during the short sequence; most will have noise floor amplitude because they radially removed from the RWH. |
| 410(g)(1)(B) | Compare (against peak value) the amplitude of each burst slot and log the slot as: (a) entering the linear range (35% to 65%), (b) near burst center (above 90%) or (c) leaving the linear range (if below 35% and peak flag is set). |
| 410(g)(1)(C) | Compare every burst in the linear range with its immediately previous value; (a) if both are in linear range, subtract to obtain the "radial distance moved" |

-continued

| | |
|---|---|
| | during the revolution on ID side of burst and (b) change the sign if the peak flag is set for the burst (OD side of burst); otherwise ignore. |
| 410(g)(2) | Accumulate the mean of all "radial distance moved" acquired in step 410(g)(1)(C) and accumulate this number as "current radial position"in arbitrary units scaled to readback amplitude. |
| 410(g)(3) | For each burst in the linear range, compute iPos as "current radial position" + (half-amplitude less current amplitude) or (if peak flag is set) compute oPos as "current radial position" + (half-amplitude less current amplitude). |
| 410(g)(4) | Similarly accumulate the iAPCT and oAPCT half-amplitude values, where (iAPCT - oAPCT) |

In step 410(g)(3), as used herein, iPos is defined as the radial position in arbitrary amplitude-based units of the half-amplitude point on the ID side of a servo burst. Similarly, oPos is defined as the radial position in arbitrary amplitude-based units of the half-amplitude point on the OD side of a servo burst. Because the magnitude of the difference (iPos-oPos) is then half of the RWH write-width in the same units, these (iPos, oPos) radial position values may be expressed as percentages of RWH write-width.

In step 410(g)(4), as used herein, iAPCT is defined as the target radial position in arbitrary amplitude-based units of the half-amplitude point on the ID side of a properly-spaced quad servo burst (FIG. 3). Similarly, oAPCT is defined as the target radial position in arbitrary amplitude-based units of the half-amplitude point on the OD side of a properly-spaced quad servo burst (FIG. 3). The magnitude of the difference (iAPCT-oAPCT) is then two servo tracks (the radial distance from A to C) at the desired track pitch needed to obtain the desired read element APCT operating point 64 (FIG. 3), which may also be expressed as percentages of RWH write-width in view of the known relationship between write width and amplitude units.

After completing the final step 410(h)(3) for the last RWH in DSD 20, a single RWH is selected (with the associated predetermined VCM signal value sequence) for writing the tightly-spaced startup sequence and servo seed tracks in the next step 412. If the usual default RWH was not rejected, it is selected. Otherwise, another RWH is selected and its identifier logged and the process proceeds to the SSW startup step 414.

The SSW startup step 414 includes the tightly-spaced sequence step 416 and the servo seed track step 418. Step 416 begins like step 408 except it is limited to a single RWH (the propagation head) in the crashstop region of a single data storage surface. Using the new VCM signal value sequence, a short open-loop tightly-spaced sequence is written by performing the following steps.

| | |
|---|---|
| Step 416(a) | Write a single burst in a sector and increment the burst number (and sector number after N bursts are written in a sector) and record the VCM value as gray code in the burst or linked elsewhere to the circumferential burst position. |
| Step 416(b) | Increment the VCM signal value to the next value in the predetermined sequence |
| Step 416(c) | Read all prior-written circumferential burst positions during the next revolution and perform the steps of: (1) Measure the radial distance moved during the disk revolution; (2) Accumulate the radial distance moved to obtain the current radial position in arbitrary amplitude units; (3) Collect the ID and OD half-amplitude positions (iPos, oPos) for each burst in the same amplitude units; and |

-continued

| | |
|---|---|
| | (4) Collect the ID and OD APCT half-amplitude positions (iAPC and oAPC) for each burst in the same amplitude units. |
| Step 416(d) | Repeat steps 416(a)-(c) until the earlier bursts are read back by the read element (having moved beyond one RWH offset in the sequence). |
| Step 416(e) | Record the last-written servo burst number and begin a PID loop each revolution and write at a constant step rate. |

Step 416(*e*) continues the initial open-loop tightly-spaced sequence with a closed-loop tightly-spaced sequence that uses the position data accumulated in step 416(*c*) to operate a servo control loop that positions the RWH to write the next servo bursts in the startup sequence. The current position is available from step 416(*c*)(2) and the servo loop gains are available in the servo controller. This is a special case for closed-loop servo control and proper operation assumes that the VCM signal sequence is sweeping very slowly from ID to OD, at preferably no more than 2-3% of a track width per disk revolution. Successful servo operation is also facilitated by the stabilization fo the actuator arm against the crashstop during the entire process. A fairly consistent servo burst spacing is obtained in the second (closed-loop) portion of the tightly-spaced sequence by performing the following steps.

| | |
|---|---|
| Step 416(e)(1) | Write a single burst in a sector and increment the burst number (and sector number after N bursts are written in a sector) and record the VCM value as gray code in the burst or linked elsewhere to the circumferential burst position. |
| Step 416(e)(2) | Instruct the servo loop to move to OD by 2-3% of a track width, whereby the VCM signal value is adjusted under closed-loop control. |
| Step 416(e)(3) | Read all prior-written circumferential burst positions during the next revolution and perform the steps of: (1) Measure the radial distance moved during the disk revolution; (2) Accumulate the radial distance moved to obtain the current radial position in arbitrary amplitude units; (3) Collect the ID and OD half-amplitude positions (iPos, oPos) for each burst in the same amplitude units; and (4) Collect the ID and OD APCT half-amplitude positions (iAPC and oAPC) for each burst in the same amplitude units. |
| Step 416(e)(4) | Repeat steps 416(e)(1)-(3) until the burst number recorded at PID start is read back by the read element (having moved beyond the second RWH offset in the sequence). |
| Step 416(e)(5) | Record the last-written servo burst number and repeat steps 416(e)(1)-(3) until the burst number recorded is read back by the read element (having moved beyond the third RWH offset in the sequence). |

After completion of step 416, the tightly-spaced sequence of servo bursts extends over at least three RWH offsets (e.g., 30 data tracks) in the crashstop region of one data storage surface and the bursts in the second closed-loop portion of the tightly-spaced sequence are disposed with a precision sufficient to facilitate the closed-loop creation of concentric servo seed tracks in step 418. No additional measurements or testing is necessary before generating the servo seed tracks because all RWH parameters have been collected for all RWHs in DSD 20 and the individual burst positions in the closed-loop portion of the tightly-spaced sequence are known (e.g., see the above discussion of FIGS. 5-7).

Figure 12:
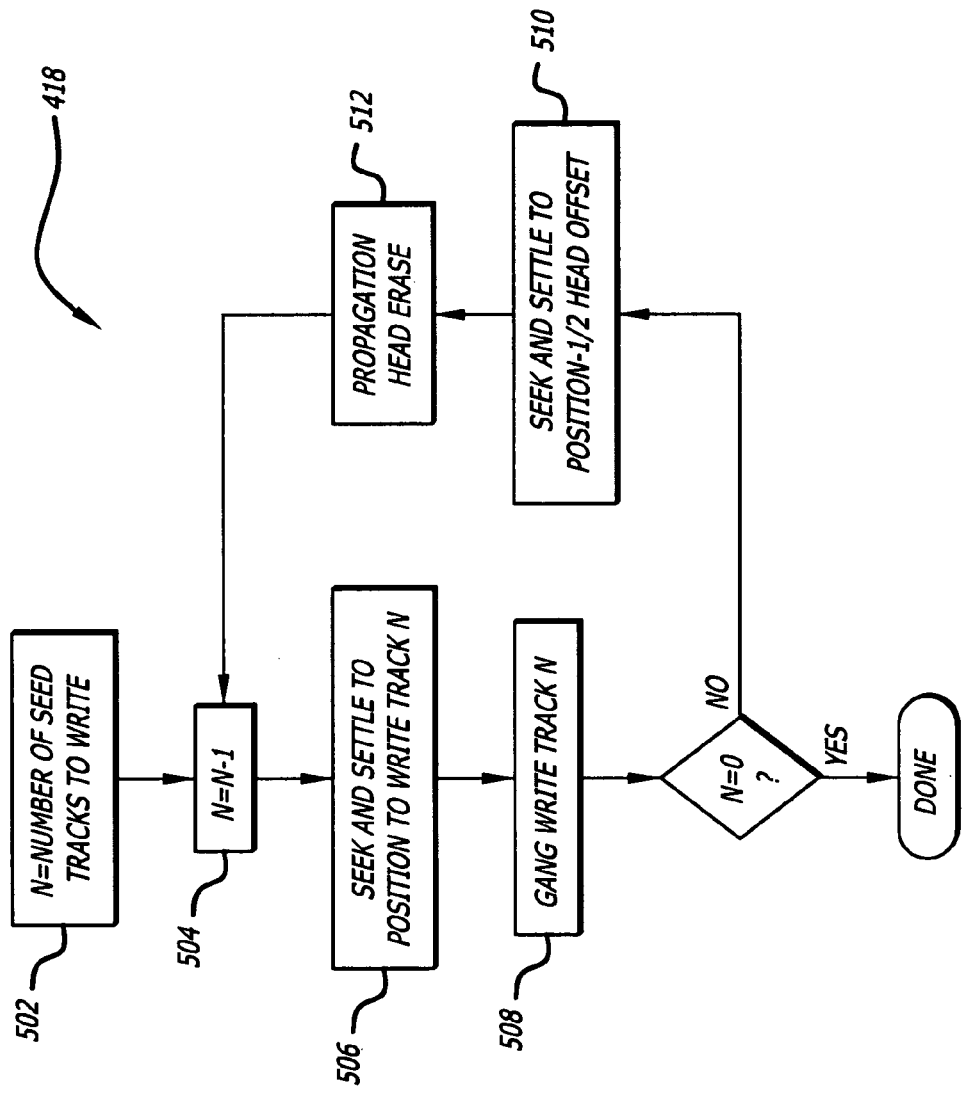
FIG. 12 is a schematic diagram illustrating the generation of the concentric servo seed tracks from the tightly-spaced servo burst sequence of FIG. 4.
Figure 13:
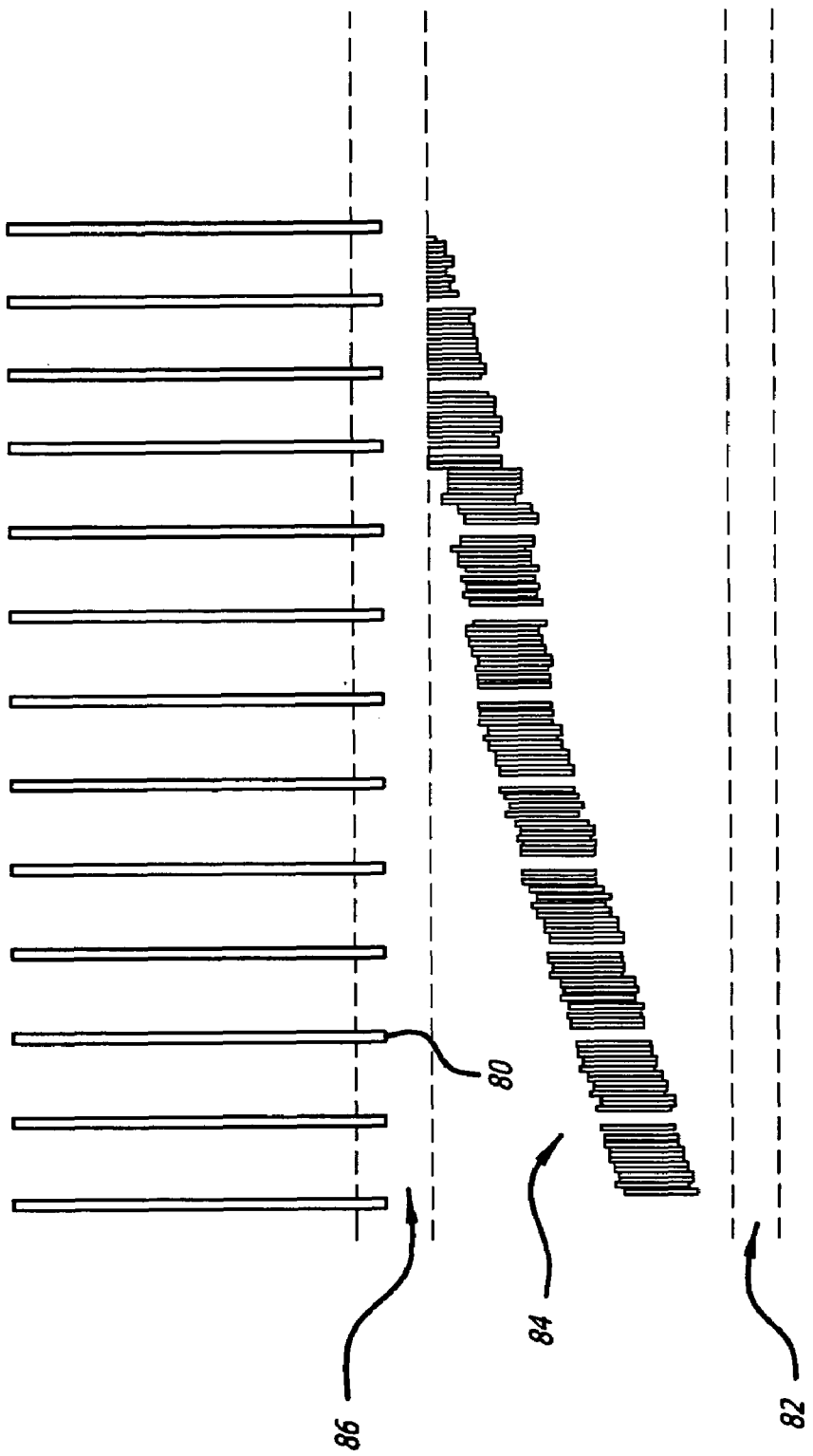
FIG. 13 is a schematic diagram illustrating the closely-spaced servo-burst sequence and servo seed track sectors employed to generate servo seed tracks according to the method of this invention.

FIG. 12 is a flow chart illustrating the servo seed track generation step 418 in more detail. An important feature of this technique is the closed-loop seek and track operation using the mapped position data collected from the second closed-loop portion of the tightly-spaced sequence. Referring also to FIG. 13, each new servo seed track, which includes a plurality of the servo seed sectors exemplified by the seed sector 80, is written on the ID side of the earlier seed tracks. Step 418 begins by specifying the number N of concentric servo seed tracks at the step 502 and continues into an iterative loop at the indexing step 504, which decrements an index n from N to 1. In the next step 506, the propagation RWH seeks and settles on the $n^{th}$ servo seed track by servoing on the readback signals from the propagation RWH read path 82 across the closely-spaced startup sequence 84. In the step 508, all RWHs gang-write the $n^{th}$ servo seed track on all data storage surfaces on the ID side of all previously-written servo seed tracks. Unless n=0, the propagation RWH is radially repositioned inward by one-half track in the step 510 under by servoing on the readback signals from propagation RWH read path 82 across closely-spaced startup sequence 84. In the next step 512, the propagation RWH erases an erase band 86 preparatory to reentering the iterative loop at step 504. Thus, the servo seed tracks are written from the outside inward while progressively erasing closely-spaced servo burst sequence 84, the inner portion of which remains available for servoing the propagation RWH because of the RWH offset distance. The preferred technique for servoing on tightly-spaced servo-burst sequence 84 is discussed below in connection with FIG. 14. This technique is a "slow-rate" technique that is facilitated by the crashstop engagement of the actuator arm and has been demonstrated to perform well over the second closed-loop portion of the startup sequence unless seeking very close to the OD edge of sequence 84.

Returning to FIG. 11, after the requisite number N of servo seed tracks are written in step 418, the SSW startup step 414 is complete. The full rate servo loop may now be started in the next step 420, using the servo seed tracks written in step 418. With these servo seed tracks, SSW propagation proceeds from ID to OD for each RWH on each data storage surface in the next step 422 using the conventional ABCD quad-servo burst servo sector information (e.g., sector 80 in FIG. 13) to seek and settle and write to each new servo track in turn.

Figure 14:
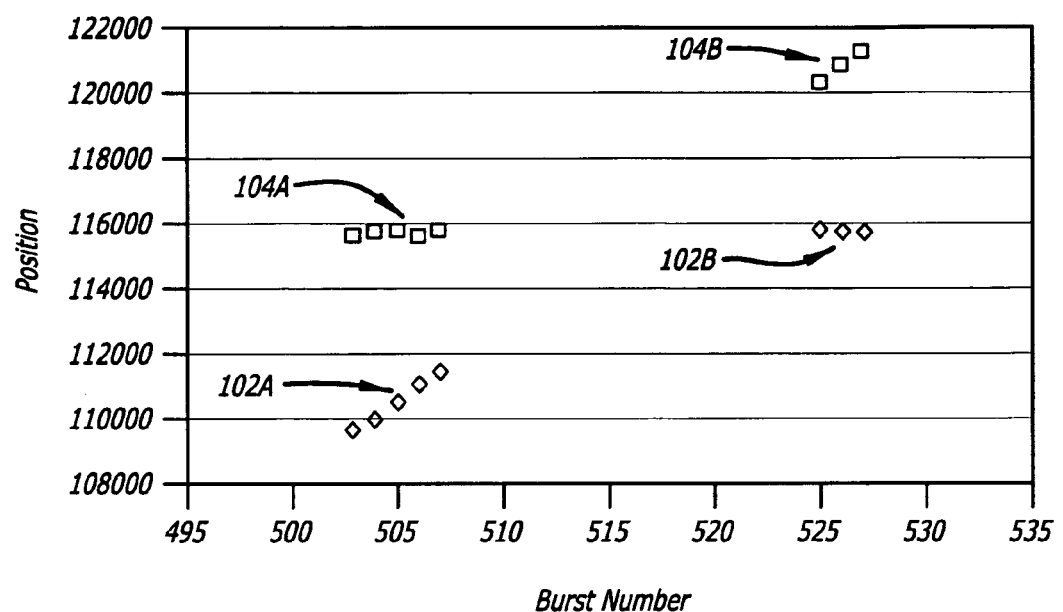
FIG. 14 is a chart illustrating read head position estimates obtained using an exemplary method for servoing on a tightly-spaced servo burst sequence suitable for use with the system of this invention.

Servoing on the Tightly-Spaced Sequence:

FIG. 14 is a chart illustrating read head position estimates measured by the inventors using a method for servoing on a tightly-spaced servo burst sequence of this invention, which is now described in connection with the following table of measured burst position data.

| Burst Number | Measured Burst Position | | Readback Amplitude | Position Estimates | |
|---|---|---|---|---|---|
| | ID 50% Edge | OD 50% Edge | | Head ID | Head OD |
| 500 | 109332 | 114448 | | | |
| 501 | 109643 | 114797 | | | |
| 502 | 109878 | 115053 | | | |
| 503 | 110120 | 115235 | 1101 | 109696 | 115659 |
| 501 | 110286 | 115368 | 1215 | 109976 | 115678 |
| 505 | 110596 | 115700 | 1456 | 110530 | 115766 |
| 506 | 110773 | 115978 | 1842 | 111090 | 115661 |
| 507 | 110984 | 116113 | 1939 | 111398 | 115699 |
| 508 | 111223 | 116424 | | | |
| 509 | 111412 | 116645 | | | |
| 510 | 111679 | 116882 | | | |
| Bursts 511-521 omitted for convenience of illustration. | | | | | |
| 522 | 114621 | 119892 | | | |
| 523 | 114827 | 120247 | | | |
| 524 | 115183 | 120388 | | | |
| 525 | 115412 | 120624 | 1889 | 115776 | 120260 |
| 526 | 115662 | 120970 | 1627 | 115764 | 120868 |
| 527 | 115852 | 121126 | 1422 | 115749 | 121229 |
| 528 | 116180 | 121442 | | | |
| 529 | 116475 | 121681 | | | |
| 530 | 116658 | 121953 | | | |

The first column of the table is the "Burst Number," counted from the sector 0 burst 0 through the last sector, last burst for the entire tightly-spaced startup sequence 84 (FIG. 13), and it includes the 30 bursts likely to have non-zero amplitude during a revolution with the head held stationery (see FIG. 5). The second and third columns of the table are the "Measured Burst Position" data gained during the measurement pass from ID to OD in step 416(c) discussed above in connection with FIG. 11 and represent the ID and OD half-amplitude radial locations for each burst, respectively, in units equal to the VCM DAC input number corresponding to the radial location. The fourth column of the table is the "Readback Amplitude" representing the information from the read head element for one particular revolution through the tightly-spaced startup sequence 84. Because for these purposes, any burst that does not have a readback amplitude within the 35%-65% range 60A-B (FIG. 2) is ignored, including any of the highest amplitude bursts 511-521, the corresponding readback amplitude is omitted to simplify the table. For the example shown, the peak burst amplitude is 3050, the qualifying range 60A-B is [1068, 1983] and the half-amplitude is 1525. Finally, the fifth and sixth columns of the table are the "Position Estimates" obtained for each burst. From each single burst amplitude reading, two head position estimates are obtained. Each Head ID position estimate is computed by subtracting from the corresponding Measured ID 50% Edge Burst Position both the difference between the Half-Amplitude (1525 in this example) and the corresponding Readback Amplitude. Similarly, each Head OD position estimate is computed by adding to the corresponding Measured OD 50% Edge Burst Position the difference between the Half-Amplitude (1525 in this example) and the corresponding Readback Amplitude. So, for burst 503, the ID Estimate is 110120−(1525−1101)=109696 and the OD Estimate is 115235+(1525−1101)=115659.

In FIG. 14, the diamond symbols 102A-B represent head ID position estimates from the fifth column of the table and the square symbols 104A-B represent head OD position estimates from the last column of the table. From the chart, it may be readily appreciated that each burst has one position estimate (104A or 102B) located consistently just under 116000 and all other estimates diverge meaninglessly, as may be expected. The radial "servo" position reported by this single revolution through startup sequence 84 (FIG. 13) is the one that is consistent, in groups 104A and 102B, and is measured by this method with a precision denoted by the range [115659, 115776] or 115717 plus or minus 59.

Clearly, other embodiments and modifications of this invention may occur readily to those of ordinary skill in the art in view of these teachings. Although the invention has been described with reference to the presently preferred embodiment, it should be understood that various modifications can be made without departing from the spirit of the invention. Therefore, this invention is to be limited only by the following claims, which include all such embodiments and modifications when viewed in conjunction with the above specification and accompanying drawing.

We claim:

1. A method for writing embedded servo position information in the data storage tracks of a data storage device (DSD) having (1) a rotating data storage medium with at least one data storage surface containing the data storage tracks each disposed over a plurality of sectors, (2) a read/write head (RWH) disposed in a transducing relationship with the data storage surface, (3) an actuator for disposing the RWH in a radial position on the data storage surface according to a voice-coil motor (VCM) signal value, (4) at least one crashstop disposed to limit actuator motion, and (5) a servo control loop for producing the VCM signal responsive to information read from the data storage surface, the method comprising the steps of:
   (a) forcing the actuator against a crashstop, thereby moving the RWH to a crashstop region of the data storage surface;
   (b) writing an open-loop sequence of servo bursts in the crashstop region;
   (c) writing a closed-loop sequence of servo bursts each positioned in the crashstop region according to amplitude information read from a plurality of servo bursts written earlier;
   (d) writing a plurality of closed-loop servo seed tracks each positioned in the crashstop region according to amplitude information read from a plurality of servo bursts written earlier; and
   (e) writing a plurality of servo tracks each positioned according to servo positioning information read from a servo track written earlier, whereby the servo tracks are propagated across the data storage surface from the servo seed tracks under servo loop control.

2. The method of claim 1 further comprising the steps of:
   (a.1) writing a short sequence of servo bursts in the crashstop region; and
   (a.2) reading the short servo-burst sequence amplitudes over a plurality of tracks to determine the VCM signal value change corresponding to a one-track change in RWH position in the crashstop region, whereby a predetermined sequence of VCM signal values may be selected for writing another open-loop servo burst sequence.

3. The method of claim 2 further comprising the steps of:
   (b.1) moving the RWH to a radial position disposed according to one of the predetermined sequence of VCM signal values; and
   (b.2) writing a single servo burst, whereby the open-loop servo burst sequence is generally disposed along a segmented spiral path in the crashstop region.

4. The method of claim 3 further comprising the steps of:
   (c.1) moving the RWH to a radial position disposed according to a VCM signal value produced in response to amplitude information read from a plurality of servo bursts written earlier; and
   (c.2) writing a single servo burst, whereby the closed-loop servo burst sequence is generally disposed along a segmented spiral path in the crashstop region.

5. The method of claim 4 further comprising the steps of:
   (d.1) seeking and settling the RWH on a new servo seed track disposed according to a VCM signal value produced in response to amplitude information read from the closed-loop servo burst sequence; and
   (d.2) writing a servo position information pattern in all sectors of the new servo seed track, whereby the closed-loop servo seed track plurality are generally concentrically disposed in the crashstop region.

6. The method of claim 5 further comprising the steps of:
   (e.1) seeking and settling the RWH on a new servo track disposed according to a VCM signal value produced in response to information read from an existing servo track; and
   (e.2) writing a servo position information pattern in all sectors of the new servo track.

7. The method of claim 1 further comprising the steps of:
   (b.1) moving the RWH to a radial position disposed according to one of a predetermined sequence of VCM signal values; and
   (b.2) writing a single servo burst, whereby the open-loop servo burst sequence is generally disposed along a segmented spiral path in the crashstop region.

8. The method of claim 1 further comprising the steps of:
   (c.1) moving the RWH to a radial position disposed according to a VCM signal value produced in response to amplitude information read from a plurality of servo bursts written earlier; and
   (c.2) writing a single servo burst, whereby the closed-loop servo burst sequence is generally disposed along a segmented spiral path in the crashstop region.

9. The method of claim 1 further comprising the steps of:
   (d.1) seeking and settling the RWH on a new servo seed track disposed according to a VCM signal value produced in response to amplitude information read from the closed-loop servo burst sequence; and
   (d.2) writing a servo position information pattern in all sectors of the new servo seed track, whereby the closed-loop servo seed track plurality are generally concentrically disposed in the crashstop region.

10. The method of claim 1 further comprising the steps of:
    (e.1) seeking and settling the RWH on a new servo track disposed according to a VCM signal value produced in response to information read from an existing servo track; and
    (e.2) writing a servo position information pattern in all sectors of the new servo track.

11. A data storage device (DSD) comprising:
    a rotating data storage medium having at least one data storage surface defining a plurality of generally concentric data storage tracks each disposed over a plurality of sectors;
    a read/write head (RWH) supported in a transducing relationship with the data storage surface by an actuator;
    at least one crashstop disposed to limit actuator motion;
    a voice coil motor (VCM) coupled to the actuator for positioning the RWH responsive to a VCM signal;
    a servo control loop coupled to the VCM and the RWH for producing a VCM signal responsive to information read from the data storage tracks; and
    a servowriting controller coupled to the servo control loop for writing the embedded servo position information in the data storage tracks on the data storage surface, comprising:
      means for forcing the actuator against a crashstop, thereby moving the RWH to a crashstop region of the data storage surface,
      means for writing an open-loop sequence of servo bursts in the crashstop region, means for writing a closed-loop sequence of servo bursts each positioned in the crashstop region according to amplitude information read from a plurality of servo bursts written earlier, means for writing a plurality of closed-loop servo seed tracks each positioned in the crashstop region according to amplitude information read from a plurality of servo bursts written earlier, and means for writing a plurality of servo tracks each positioned according to servo positioning information read from a servo track written earlier, whereby the servo tracks are propagated across the data storage surface from the servo seed tracks under servo loop control.

12. The DSD of claim 11 wherein the servowriting controller further comprises:

means for writing a short sequence of servo bursts in the crashstop region; and means for reading the short servo-burst sequence amplitudes over a plurality of tracks to determine the VCM signal value change corresponding to a one-track change in RWH position in the crashstop region, whereby a predetermined sequence of VCM signal values may be selected for writing another open-loop servo burst sequence.

13. The DSD of claim 12 wherein the servowriting controller further comprises:

means for moving the RWH to a radial position disposed according to one of the predetermined sequence of VCM signal values; and means for writing a single servo burst; whereby the open-loop servo burst sequence is generally disposed along a segmented spiral path in the crashstop region.

14. The DSD of claim 13 wherein the servowriting controller further comprises:

means for moving the RWH to a radial position disposed according to a VCM signal value produced in response to amplitude information read from a plurality of servo bursts written earlier; and means for writing a single servo burst, whereby the closed-loop servo burst sequence is generally disposed along a segmented spiral path in the crashstop region.

15. The DSD of claim 14 wherein the servowriting controller further comprises:

means for seeking and settling the RWH on a new servo seed track disposed according to a VCM signal value produced in response to amplitude information read from the closed-loop servo burst sequence; and means for writing a servo position information pattern in all sectors of the new servo seed track, whereby the closed-loop servo seed track plurality are generally concentrically disposed in the crashstop region.

16. The DSD of claim 15 wherein the servowriting controller further comprises:

means for seeking and settling the RWH on a new servo track disposed according to a VCM signal value produced in response to information read from an existing servo track; and means for writing a servo position information pattern in all sectors of the new servo track.

17. The DSD of claim 11 wherein the servowriting controller further comprises:

means for moving the RWH to a radial position disposed according to one of a predetermined sequence of VCM signal values; and means for writing a single servo burst; whereby the open-loop servo burst sequence is generally disposed along a segmented spiral path in the crashstop region.

18. The DSD of claim 11 wherein the servowriting controller further comprises:

means for moving the RWH to a radial position disposed according to a VCM signal value produced in response to amplitude information read from a plurality of servo bursts written earlier; and means for writing a single servo burst, whereby the closed-loop servo burst sequence is generally disposed along a segmented spiral path in the crashstop region.

19. The DSD of claim 11 wherein the servowriting controller further comprises:

means for seeking and settling the RWH on a new servo seed track disposed according to a VCM signal value produced in response to amplitude information read from the closed-loop servo burst sequence; and means for writing a servo position information pattern in all sectors of the new servo seed track, whereby the closed-loop servo seed track plurality are generally concentrically disposed in the crashstop region.

20. The DSD of claim 11 wherein the servowriting controller further comprises:

means for seeking and settling the RWH on a new servo track disposed according to a VCM signal value produced in response to information read from an existing servo track; and means for writing a servo position information pattern in all sectors of the new servo track.

* * * * *